H. HERTZBERG & M. J. WOHL.
ELECTRICALLY OPERATED STOVE.
APPLICATION FILED AUG. 1, 1907.

918,747.

Patented Apr. 20, 1909.
2 SHEETS—SHEET 1.

WITNESSES
H. C. Abbott
V. E. Nichols

INVENTORS
Harry Hertzberg and
Maurice J. Wohl
BY
Griffin Bernhard
ATTORNEYS

H. HERTZBERG & M. J. WOHL.
ELECTRICALLY OPERATED STOVE.
APPLICATION FILED AUG. 1, 1907.

918,747.

Patented Apr. 20, 1909.
2 SHEETS—SHEET 2.

WITNESSES
H. C. Abbott
T. E. Nichols

INVENTORS
Harry Hertzberg and
Maurice J. Wohl
BY
Griffins Bernhard
ATTORNEYS

UNITED STATES PATENT OFFICE.

HARRY HERTZBERG AND MAURICE J. WOHL, OF NEW YORK, N. Y., ASSIGNORS TO ECONOMY ELECTRIC COMPANY, OF BROOKLYN, NEW YORK, A CORPORATION OF NEW YORK.

ELECTRICALLY-OPERATED STOVE.

No. 918,747.          Specification of Letters Patent.          Patented April 20, 1909.

Application filed August 1, 1907. Serial No. 386,550.

*To all whom it may concern:*

Be it known that we, HARRY HERTZBERG and MAURICE J. WOHL, citizens of the United States, residing in the city of New York, borough of Brooklyn, county of Kings, and State of New York, have invented a certain new and useful Electrically-Operated Stove, of which the following is a specification.

This invention is a stove especially intended for cooking and domestic purposes, although it is not intended to confine the invention strictly to such uses.

One object is to utilize the heat evolved in an electrical resistance by the passage of an electric current as a medium for economically and quickly heating an element of the new structure.

Another object is to simplify the mechanical construction of the stove or heater with a view to easily and quickly assembling the parts, and, furthermore, to clamp the electrical resistance firmly in place between the elements of the structure, whereby dissipation of the heat is minimized and it is absorbed almost wholly by that element on which the heating or cooking operations are to be performed.

A further object is to regulate the heat developed by a plurality of electrical resistances by the aid of a simple and easily operated device, whereby at least three degrees of heat, each at a uniform temperature, may be maintained in the stove or structure.

In the accompanying drawings, we have illustrated one practical embodiment of the invention, but the construction shown therein is to be understood as illustrative only, and not as defining the limits of the invention.

Figure 1:
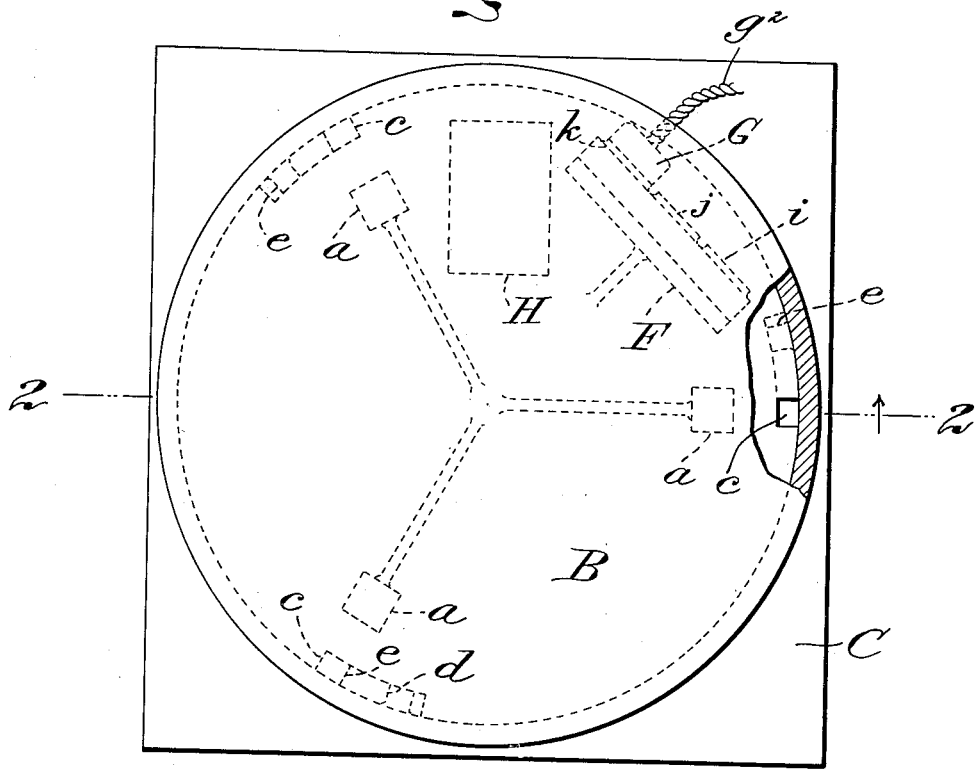
Figure 2:
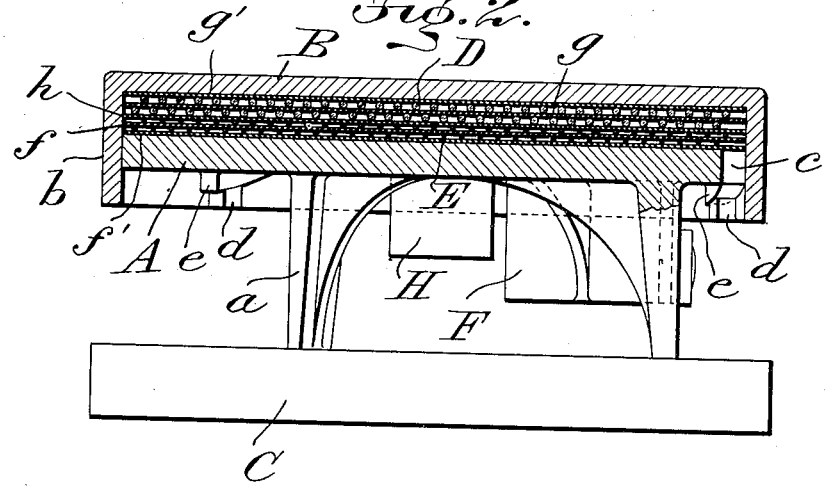
Figure 3:
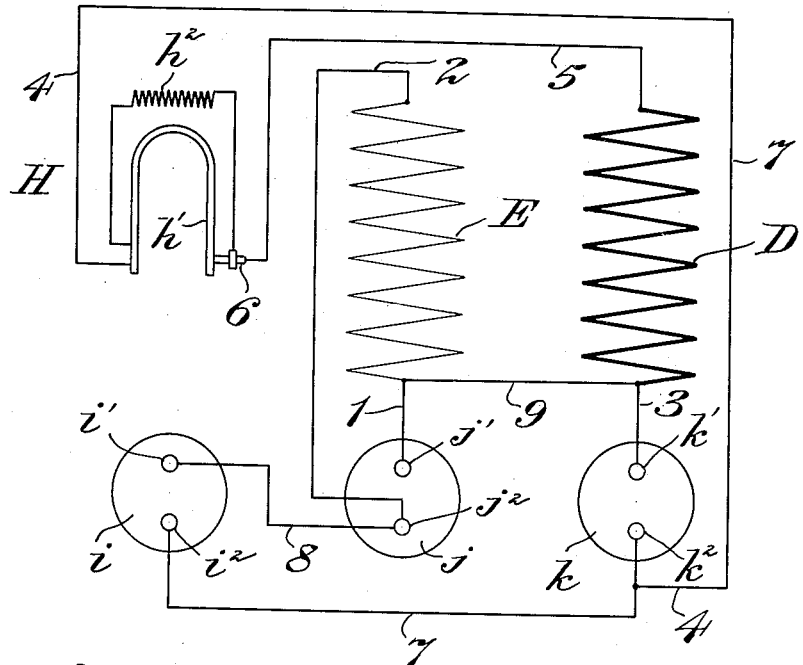
Figures 4, 5:
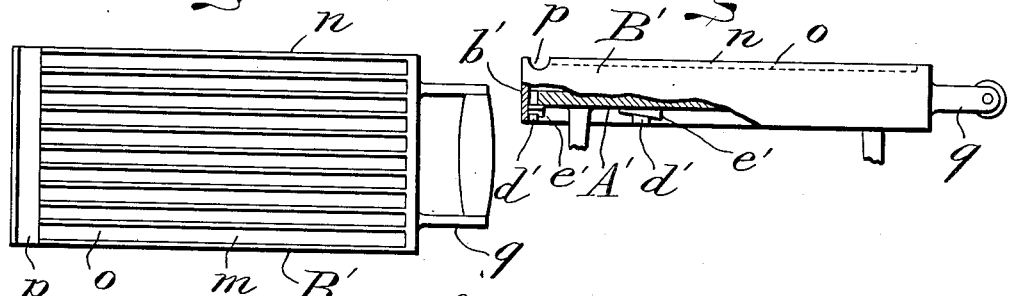
Figure 6:
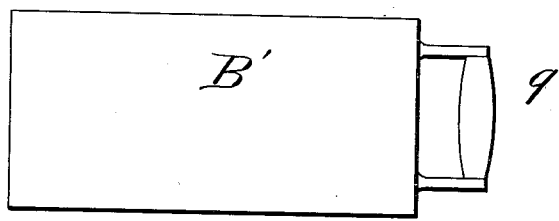

Figure 1 is a plan view of an electric heater embodying our invention, a part of one of the members being broken away. Fig. 2 is a vertical cross section on the line 2—2 of Fig. 1. Fig. 3 is a diagram showing a plurality of heating elements of different electrical resistances, and illustrating means whereby an electric current may be supplied to the heating elements individually or collectively. Fig. 4 is a plan view of another form of the electrical heater. Fig. 5 is a side elevation, partly in section, of the heater shown in Fig. 4. Fig. 6 is a plan view of another form of the heater shown in Figs. 4 and 5.

The heater shown in Figs. 1 and 2 is adapted for use as a cooking stove, although it may be employed for other purposes. Said heater is composed, mainly, of coöperating members, A, B, and one or more electrically operated heating elements, presently described, confined between said members, A, B. The member, A, is shown as having suitable legs, *a*, whereby the heater may be supported on a base, C, which may consist of a slab of slate or other nonconductor of heat. The member, A, is provided, furthermore, with a plurality of openings or notches, *c*, which are situated, preferably, at the edge of the member and equidistant from each other. The member, B, is provided at its edge with a depending flange or rim, *b*, the latter being adapted to fit over the edge of the member, A, and to extend below said member for the purpose of inclosing it, and also of inclosing the electrical heating element or elements which are confined between and clamped by the members, A, B. As one means for uniting the members, A, B, and clamping the electrical heating elements in close contact with said members, the heater is shown as being provided with coöperating devices adapted to draw the members, A, B, toward each other by a partial rotary movement of one member with respect to the other member; but it is to be understood that the invention is not intended to be limited to the specified form of clamping mechanism about to be described, for the reason that equivalent devices may be employed for such purposes. The member, B, is provided at the lower portion of the rim, *b*, with inwardly extending lugs, *d*, the latter being preferably integral with the rim and spaced corresponding to the notches, *c*, of the member, A, whereby the lugs, *d*, may be slipped through the notches, *c*, when assembling the members, A, B. *e* designate wedges which are preferably made integral with the member, A, and are disposed thereon in the path of the lugs, *d*, said lugs being adapted for engagement with said wedges, *e*, when the member, B, is placed in position and is turned with relation to the member, A. The wedges and the lugs, *d*, coöperate in drawing the members, A, B, toward each other.

The heater is shown as provided with two heating elements consisting, preferably, of wires or ribbons, D, E, which are of different electrical resistances. The wire or ribbon, D, consists of a heavy wire wound to produce a coarse coil, whereas the heating element, E, is composed of a thin wire wound into a fine coil. The heating elements are insulated electrically from each other and from the members, A, B, and it is preferred to superpose one member upon the other, Fig. 2 showing the coarse low resistance coil, D, upon the fine high resistance coil, E. The coil, E, is wound on a core, $f$, composed of a thin layer of mica, and this coil is insulated from metallic contact with the member, A, by a layer of mica, $f'$. The resistance coil, D, is wound on an insulating core, $g$, composed of mica, and said coil is insulated from the member, B, by a mica layer, $g'$.

In assembling the parts of the stove the insulating layer, $f'$, is laid on the member, A, the coil, E, is placed upon the layer, $f'$, the insulating layer, $h$, of mica is placed on the coil, E, the coil, D, is then placed on the layer, $h$, and the layer, $g'$, is imposed on the coil, D, after which the member, B, is placed over the coils and insulating layers so that its rim, $b$, will inclose all of the parts, after which the wedges, $e$, operate to draw the members, A and B, toward each other and thus clamp the coils, D, E, into engagement with the members, B, A, respectively.

In Fig. 3 of the drawings, the heating coils, D, E, are shown in connection with means whereby an electrical current may be supplied individually or collectively to said coils for the purpose of regulating the heat generated by the stove.

The member, A, is shown in Figs. 1 and 2 as having a connection block, F, composed preferably of porcelain and fastened in a suitable way to the underside of said member, A. This block is provided with a plurality of sockets, preferably three in number, indicated at $i$, $j$, $k$, in either of which may be fitted a plug, G, from which leads a cord, $g^2$.

The coils, D, E, are in parallel in an electric circuit which includes a thermostatic cut out, H. The wiring is as follows: From one terminal, $j'$, of the socket, $j$, leads a wire $l$ connected with one end of the resistance coil, E, and from the other end of this coil extends a wire 2 which is connected with the other terminal, $j^2$, of the socket, $j$. The socket, $k$, has terminals $k'$, $k^2$, from which lead the wires 3 and 4, the wire 3 leading to one end of the resistance coil, D. From the other end of this resistance coil leads a wire 5 which is connected with a terminal 6 of the thermostatic cut out, H. This cut out is provided with a spring, $h'$, preferably of composite construction adapted to be deflected by excessive heating, and normally this spring is in metallic contact with the terminal 6. The thermostatic cut out includes a resistance coil, $h^2$, which is in a shunt circuit around the spring, $h'$, one end of said resistance coil, $h^2$, being connected with the terminal 6, while the other end of said coil is in electrical engagement with a fixed end of the thermostatic spring, $h'$. To the fixed end of the spring is fastened the conductor 4, and branched from said conductor 4 is a wire 7 which is connected with one terminal, $i^2$, of the socket, $i$, the other terminal, $i'$, of said socket having a wire 8 connected to the terminal, $j^2$, of the socket, $j$.

The plug, G, is provided with the usual pins adapted to enter the two terminals of either of the sockets, $i$, $j$, $k$, for the purpose of closing the circuit when said plug is placed in position.

When it is desired to heat the stove at a low temperature, the plug, G, is engaged with the socket, $j$, thus completing the circuit through the wires 1 and 2, and directing the current into the high resistance coil, E, whereby the heat developed by said coil is transmitted through the thin insulating layers of mica to the members, A, B, of the stove. The second heat of the stove is secured by placing the plug, G, in the socket, $k$, thus closing the circuit across the terminals, $k'$, $k^2$, through the wires 3, 5, 4, whereby the coil, D, is heated and the heat is communicated to the members, A and B. The third degree of heat in the stove is secured by placing the plug, G, in the socket, $i$, and the circuit is as follows: From the terminal, $i'$, the current passes through the conductor 8 to the terminal, $j^2$, by the wire 2, through the coil, E, thence by a cross connection 9 to the coil, D, thence through said coil and the conductor 5 to the terminal 6, thence through the spring, $h'$, and through the wires 4 and 7 back to the terminal, $i^2$, of the plug, $i$, whereby the two coils, D, E, and the thermostatic regulator are included in the circuit. Should the heat be too great, the spring $h'$ of cut out H becomes deflected, thus breaking the circuit momentarily at contact 6 and cutting the resistance coil $h^2$ into the circuit.

Figs. 4, 5 and 6 of the drawings show a cooking utensil which may be employed for various domestic purposes. The stove of Figs. 1 and 2 is circular so that it may be designated as a disk heater, but the stoves or utensils of Figs. 4, 5 and 6 are substantially rectangular, although the shape, form and dimensions are obviously immaterial.

The structure shown in Figs. 4 and 5 consists of the members, A', B', adapted to clamp between themselves one or more heating elements, such as heretofore described. The member, B', is provided with a rim, $b'$, and with lugs, $d'$. Instead of making the wedges, $e'$, integral with the member, A', as in Fig. 2, the wedges, $e'$, are made in separate pieces and adapted to be driven between the lugs, $d'$, and the member, A'.

The member, B', is shown as having a working surface composed of the ribs, $n$, separated by the longitudinal drain channels, $o$, the latter opening into a transverse gutter, $p$, whereby the grease and fat from the food being cooked may be collected in the gutters, $o$, $p$. The member, B', is provided, also, with a handle, $q$, whereby the implement may be manipulated conveniently.

The utensil shown in Fig. 6 is of the same construction as that shown in Figs. 4 and 5, except that the working surface is smooth and flat.

Having thus fully described the invention, what we claim as new, and desire to secure by Letters Patent is:

1. In a device of the class described, coöperating metallic masses, said masses being rotatable with respect to each other, an interposed electrical resistance, and wedging means operated by the relative movement of the metallic masses for moving the same into mechanical engagement with said resistance.

2. In a device of the class described, metallic masses separable from each other and capable of relative rotary movement, an interposed electrical resistance unattached to said masses, and wedging means operated by the relative rotary movement of the masses for clamping the latter into mechanical engagement with said resistance.

3. In a device of the class described, metallic masses separable from each other and capable of relative rotary movement, one of said masses being flanged and adapted to incase the other metallic mass, an insulated resistance between said masses and unattached thereto, and wedging means in engagement with said metallic masses for clamping the same into mechanical engagement with said resistance.

4. In a device of the class described, coöperating members, one being adapted to have a rotary adjustment with respect to the other, an interposed electrical resistance, and means adapted to move the members into clamping engagement with said resistance by the aforesaid rotary adjustment of the member.

5. In a device of the class described, a plurality of separable members movable relative to one another, a resistance between said masses and unattached thereto, and means operated by the movement of one member relative to the other for clamping said members into mechanical engagement with said interposed resistance.

6. In a device of the class described, a plurality of metallic masses one of which is movable with respect to the other, an interposed resistance, and wedging means operated by the movement of one metallic mass relative to the other for clamping said metallic masses into mechanical engagement with said resistance.

7. In a device of the class described, coöperating members, one of which is provided with openings and lugs and the other is provided with wedges adapted, by a rotary motion of the member, to engage with said lugs, and an electrical resistance confined within said members.

8. In an electric heater, coöperating heat-absorbing members, a plurality of heating coils of different electrical resistances positioned between said members and superposed one upon the other, means for clamping said heat-absorbing members in mechanical engagement with said superposed coils, and means whereby an electrical current may be supplied to said coils individually and collectively.

9. In an electric heater, coöperating heat-absorbing members, a plurality of heating coils of different electrical resistances confined between said members, said coils being superposed one upon the other, means for electrically insulating said coils from each other, and a plurality of coöperating devices adapted to control the supply of current to said coils individually and collectively.

10. In an electric heater, coöperating heat-absorbing members, and a plurality of superposed heating coils of different electrical resistances clamped firmly between said members, each coil being wound on a separate core of insulating material, and said coils being electrically insulated from each other by intervening layers of material separate from said cores.

11. In an electric heater, a plurality of coöperating heat-absorbing members, a plurality of heating coils of different electrical resistances positioned between said members, means whereby the members are clamped into mechanical engagement with said heating coils, and means whereby an electrical current may be admitted collectively or separately to said heating coils.

12. In an electric heater, coöperating heat-absorbing members, a plurality of heating elements of different electrical resistances positioned between said members, said heating elements being included in parallel in an electric circuit, means for clamping the heat-absorbing members into firm mechanical engagement with the heating elements, and adjustable means for controlling the flow of current through the circuit whereby the current may be supplied collectively or individually to the heating elements.

13. In an electric heater, coöperating heat-absorbing members, a plurality of heating coils of different electrical resistances superposed one upon the other and clamped between said members, said heating elements being included in a circuit in parallel to each other, a thermostatic cut out having a yieldable member normally in series with one of said heating elements, and means for controlling the flow of current in said circuit whereby current may be supplied collectively or separately to said heating elements, said cut out having a resistance connected in shunt with said yieldable element, said cut out operating to close the circuit through one of said heating elements when the current flows through the latter.

14. In an electric heater, coöperating heat-absorbing members, a plurality of heating coils of different electrical resistances, and confined between said members, a thermostatic cut out provided with a yieldable part which is in series with one of said heating coils, said cut out being provided, also, with a resistance connected in shunt with the yieldable part thereof, and means for controlling the flow of current in the circuit whereby current may be supplied collectively or separately to the heating coils.

In testimony whereof we have signed our names to this specification in the presence of two subscribing witnesses.

HARRY HERTZBERG.
MAURICE J. WOHL.

Witnesses:
JAS. H. GRIFFIN,
H. I. BERNHARD.